US010455821B2

United States Patent
Takamatsu et al.

(10) Patent No.: US 10,455,821 B2
(45) Date of Patent: Oct. 29, 2019

(54) ROTOR BRAKE MECHANISM FOR SPINNING REEL

(71) Applicant: Shimano Inc., Sakai, Osaka (JP)

(72) Inventors: Takuji Takamatsu, Sakai (JP); Kei Saito, Sakai (JP); Satoshi Ikebukuro, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 154 days.

(21) Appl. No.: 15/879,499

(22) Filed: Jan. 25, 2018

(65) Prior Publication Data

US 2018/0255755 A1 Sep. 13, 2018

(30) Foreign Application Priority Data

Mar. 8, 2017 (JP) ................................. 2017-044319

(51) Int. Cl.
| | | |
|---|---|---|
| *A01K 89/01* | (2006.01) | |
| *A01K 89/033* | (2006.01) | |
| *A01K 91/20* | (2006.01) | |
| *A01K 97/12* | (2006.01) | |

(52) U.S. Cl.
CPC ............ *A01K 89/01* (2013.01); *A01K 89/033* (2013.01); *A01K 91/20* (2013.01); *A01K 97/12* (2013.01)

(58) Field of Classification Search
CPC .......... A01K 89/0108; A01K 89/01082; A01K 89/027
See application file for complete search history.

(56) References Cited

U.S. PATENT DOCUMENTS

| | | | | |
|---|---|---|---|---|
| 5,524,832 A | * | 6/1996 | Sakaguchi | ....... A01K 89/01084 242/233 |
| 6,691,940 B2 | * | 2/2004 | Katayama | .......... A01K 89/0108 242/232 |
| 2001/0054660 A1 | * | 12/2001 | Sato | .................... A01K 89/0108 242/232 |
| 2002/0148918 A1 | * | 10/2002 | Hirayama | .......... A01K 89/0108 242/232 |
| 2004/0251361 A1 | * | 12/2004 | Sugawara | .......... A01K 89/0108 242/231 |

(Continued)

FOREIGN PATENT DOCUMENTS

| | | |
|---|---|---|
| JP | 2002306032 A | 10/2002 |
| JP | 2004141144 A | 5/2004 |

*Primary Examiner* — Emmanuel M Marcelo
(74) *Attorney, Agent, or Firm* — United IP Counselors, LLC

(57) ABSTRACT

A rotor brake mechanism includes a braking member, a moving member, an elastic member, and an adjustment member. The braking member is disposed in a reel body. The moving member is disposed in a rotor to move to a first position corresponding to a line-winding posture and a second position corresponding to a line-releasing posture, in conjunction with a bail arm, and includes an extended portion that extends toward the braking member when the moving member moves to the second position. The elastic member is disposed on the extended portion of the moving member, and comes into contact with an outer peripheral surface of the braking member when the moving member moves to the second position. The adjustment member is disposed between the extended portion of the moving member and the elastic member, and adjusts a position of the elastic member.

20 Claims, 6 Drawing Sheets

(56) References Cited

U.S. PATENT DOCUMENTS

2005/0082405 A1\* 4/2005 Sugawara ............. A01K 89/01
                                                  242/223
2008/0308663 A1\* 12/2008 Hiraoka ............. A01K 89/0108
                                                  242/233

\* cited by examiner

ROTOR BRAKE MECHANISM FOR SPINNING REEL

CROSS-REFERENCE TO RELATED APPLICATIONS

This application claims priority to Japanese Patent Application No. 2017-044319 filed on Mar. 8, 2017, the entirety of which is hereby incorporated by reference in its entirety.

BACKGROUND

Technical Field

The present disclosure relates to a rotor brake mechanism for a spinning reel, in particular, to a rotor brake mechanism for a spinning reel that brakes a rotor that is rotatably mounted to a reel body, in conjunction with the swing of a bail arm that swings between a line-winding posture and a line-releasing posture.

Background Art

In a spinning reel, a bail arm for guiding a fishing line to a spool is swingably mounted to a rotor. The bail arm is configured to take on two different postures, that is, a line-winding posture when the fishing line is wound around the spool, and a line-releasing posture when the fishing line that has been wound around the spool is cast, in conjunction with the swing of the bail arm.

If the rotor rotates freely when the bail arm is in the line-releasing posture, for example due to the bail arm returning to the line-winding posture, manipulation of the spinning reel for casting a line can be difficult. Thus, a rotor with a rotor brake mechanism which prevents the rotor from rotating when the bail arm is in the line-releasing posture is known.

For example, in Japanese Patent Application Publication 2002-306032, a moving member which moves in accordance with the swing of a bail arm is provided, and a cap at a fore end of this moving member is to come into contact with a braking member of a reel body, to thereby prevent the rotor from rotating when the bail arm is in the line-releasing posture. Further, in Japanese Patent Application Publication 2003-084896, there is provided a braking member configured to engage with a moving member to frictionally engage with a reel body in a manner that allows relative rotation, to thereby prevent the rotor from rotating by the frictional engagement between the braking member and the reel body.

BRIEF SUMMARY

For example, in the brake system of Japanese Patent Application Publication 2002-306032, when a contact position of the cap with the braking member deviates due to a manufacturing error, installation error, or another issue, the compression rate of the cap fluctuates. The fluctuation in cap compression rate causes variations in friction force, making it difficult to stabilize the friction force.

Even in Japanese Patent Application Publication 2003-084896, if an engagement position of the moving member with the braking member deviates due to a manufacturing error, installation error, or another issue, sometimes predetermined friction force cannot be obtained without the braking member and the moving member engaging with each other successfully. In addition, a friction force with which the moving member pushes the braking member against the reel body varies at different engagement positions of the moving member, and hence variations occur in the friction force, and it is difficult to obtain stable friction force.

In view of the above problem, an object of the present advancement is to stabilize friction force in a rotor brake mechanism for a spinning reel.

A rotor brake mechanism for a spinning reel according to one aspect of the present disclosure is configured to brake a rotor mounted rotatably to a reel body, in conjunction with swinging of a bail arm between a line-winding posture and a line-releasing posture, and the system includes a braking member, a moving member, an elastic member, and an adjustment member. The braking member is mounted to the reel body. The moving member is in conjunction with the bail arm, and disposed in the rotor so as to move to be at a first position that corresponds to a line-winding posture and at a second position that corresponds to a line-releasing posture. Further, the moving member includes an extended portion that extends toward the braking member when the moving member moves to the second position. The elastic member is disposed on the extended portion of the moving member, so as to come into contact with an outer peripheral surface of the braking member when the moving member moves to the second position. The adjustment member is disposed between the extended portion of the moving member and the elastic member so as to adjust a position of the elastic member.

In this rotor brake mechanism for a spinning reel, because the position of the elastic member is adjustable by the adjustment member, the elastic member can be placed at a position where the elastic member is in contact with the braking member and where a predetermined amount of friction force can be obtained. With this configuration, the friction force can be stabilized free from the influence of manufacturing errors, installation errors, or other issues.

Preferably, the braking member includes a plurality of engagement portions on the outer circumference. The extended portion of the moving member engages with the engagement portions of the braking member when the moving member moves to the second position. The elastic member comes into contact with an outer peripheral surface of the braking member when the moving member moves to the second position. Also in this case, the friction force can be stabilized free from the influence of manufacturing errors, installation errors, or other issues.

Preferably, the adjustment member adjusts a radial position of the elastic member. In this case, in addition to the above-mentioned effects, the force with which the elastic member pushes the braking member is adjustable by the adjustment member, facilitating the adjustment of the friction force.

Preferably, the adjustment member is a spring that biases the elastic member radially inward. In this case, the friction force can be stabilized similarly to that for the above-mentioned effects, and also time and effort of adjusting the position of the elastic member during assembly can be eliminated, to thereby make assembly work more efficient.

Preferably, the elastic member is a rubber cap. In this case, the elastic member can be easily attached to the moving member, and the adjustment member can be held at an inner peripheral portion of the elastic member.

The rotor brake mechanism for a spinning reel according to the present disclosure can stabilize the friction force.

DETAILED DESCRIPTION OF EMBODIMENTS

First Embodiment

Figure 1:
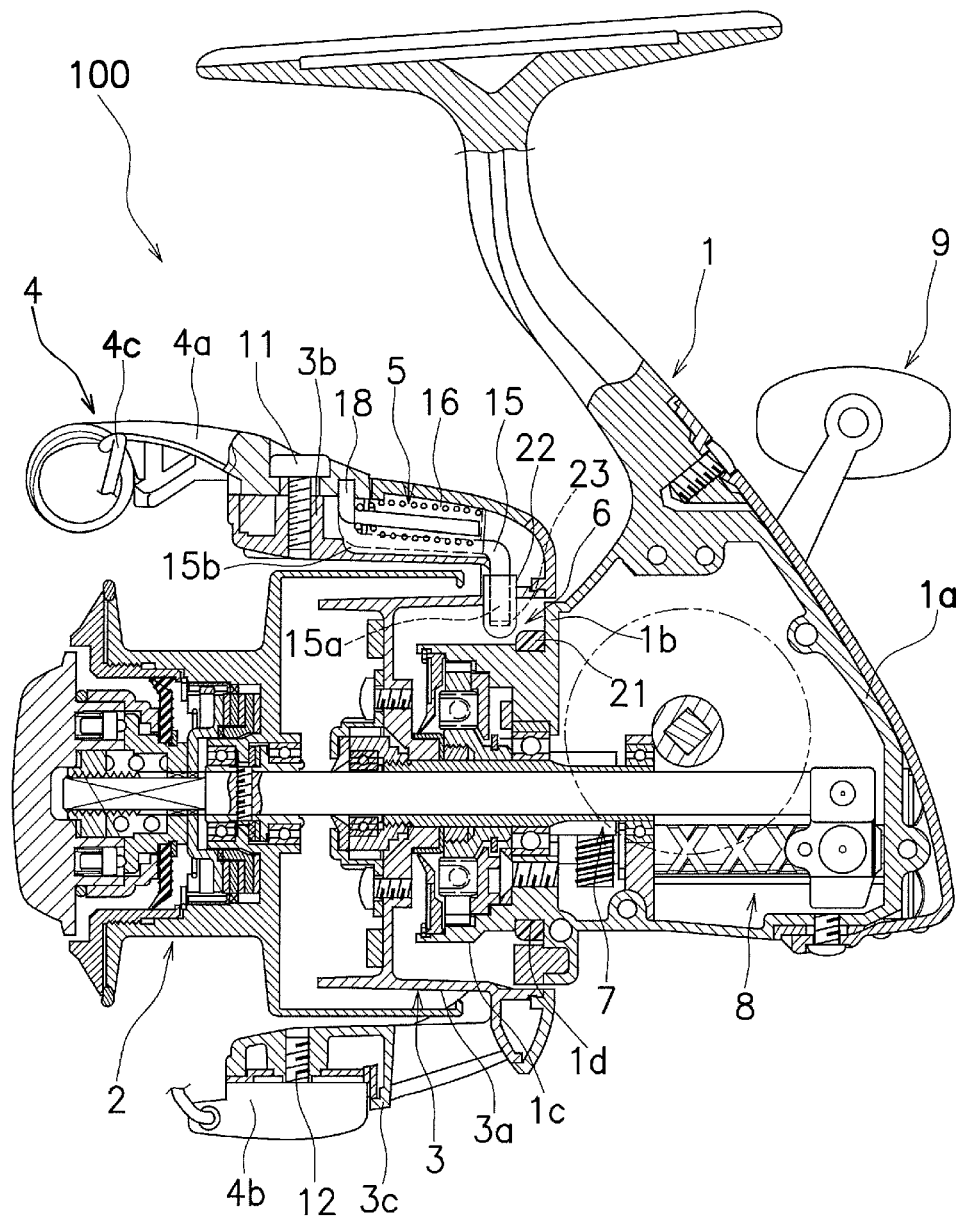
FIG. 1 is a longitudinal sectional view illustrating a spinning reel to which an embodiment of the present disclosure has been adopted.

FIG. 1 a longitudinal sectional view illustrating a spinning reel 100 to which an embodiment of the present disclosure has been adopted. The spinning reel 100 includes a reel body 1, a spool 2, a rotor 3, a bail arm 4, a bail tripping mechanism 5, and a rotor brake mechanism 6.

As illustrated in FIG. 1, the reel body 1 includes a reel body 1a having a space in it, a flange 1b on the front of the reel body 1a, and a tubular portion 1c having a diameter smaller than an outer diameter of the flange 1b. The space inside the reel body 1a accommodates, for example, a rotor driving mechanism 7 that drives the rotor 3, an oscillating mechanism 8 that is used for winding a fishing line evenly across the spool 2, and other components. The tubular portion 1c has a mounting groove 1d of a substantially D-shape as viewed from the axial direction. The reel body 1 further has a handle 9 rotatably attached to a side portion of the reel body 1.

The spool 2 is a member around which a fishing line is wound. The spool 2 moves reciprocally relative to the reel body 1 in a front-rear direction in conjunction with rotation of the handle 9.

The rotor 3 is a member that is used for winding the fishing line around the spool 2, and includes a rotor body 3a, a first rotor arm 3b, and a second rotor arm 3c. The first rotor arm 3b and the second rotor arm 3c are located on sides of the rotor body 3a respectively at positions opposing to each other across the rotor body 3a. The rotor 3 rotates about a central axis of the spool 2 in conjunction with the rotation of the handle 9.

The bail arm 4 is swingably attached to fore ends of the first rotor arm 3b and the second rotor arm 3c. The bail arm 4 swings between a line-winding posture illustrated in FIG. 2, and a line-releasing posture illustrated in FIG. 3. Note that the line-winding posture refers to a posture of the bail arm 4 for winding a fishing line around the spool 2, and the line-releasing posture refers to a posture of the bail arm 4 for casting the fishing line from the spool 2.

The bail arm 4 includes a first bail support member 4a, a second bail support 4b, and an arc-shaped bail portion 4c that connects between the first bail support 4a and the second bail support 4b.

The first bail support 4a is swingably mounted to the first rotor arm 3b with a first screw 11 that is screwed into a fore end of the first rotor arm 3b.

The second bail support 4b is swingably mounted to the second rotor arm 3c with a second screw 12 that is screwed into a front end of the second rotor arm 3c.

The bail tripping mechanism 5 is disposed inside the first rotor arm 3b. The bail tripping mechanism 5 is a mechanism to hold the bail arm 4 in the line-winding posture or the line-releasing posture. In addition, the bail tripping mechanism 5 is to return the bail arm 4 to the line-releasing posture in conjunction with the rotation of the rotor 3 when the bail arm 4 is in the line-winding posture.

As illustrated in FIG. 1 to FIG. 5, the bail tripping mechanism 5 includes a moving member (e.g., a bail trip lever) 15, a toggle spring (e.g., a bail spring) 16, and a switching member 17.

The moving member 15 is made of, for example, a metal wire, and includes a first extended portion 15a and a second extended portion 15b. The first and second extended portions 15a and 15b are formed by bending both end portions of the moving member 15 at 90° angles in different directions.

The first extended portion 15a extends at an angle toward a center of rotation of the rotor 3. The second extended portion 15b extends in a direction away from the center of rotation of the rotor 3, to be in engagement with a recessed groove 4d located in the first bail support 4a.

Figure 2:
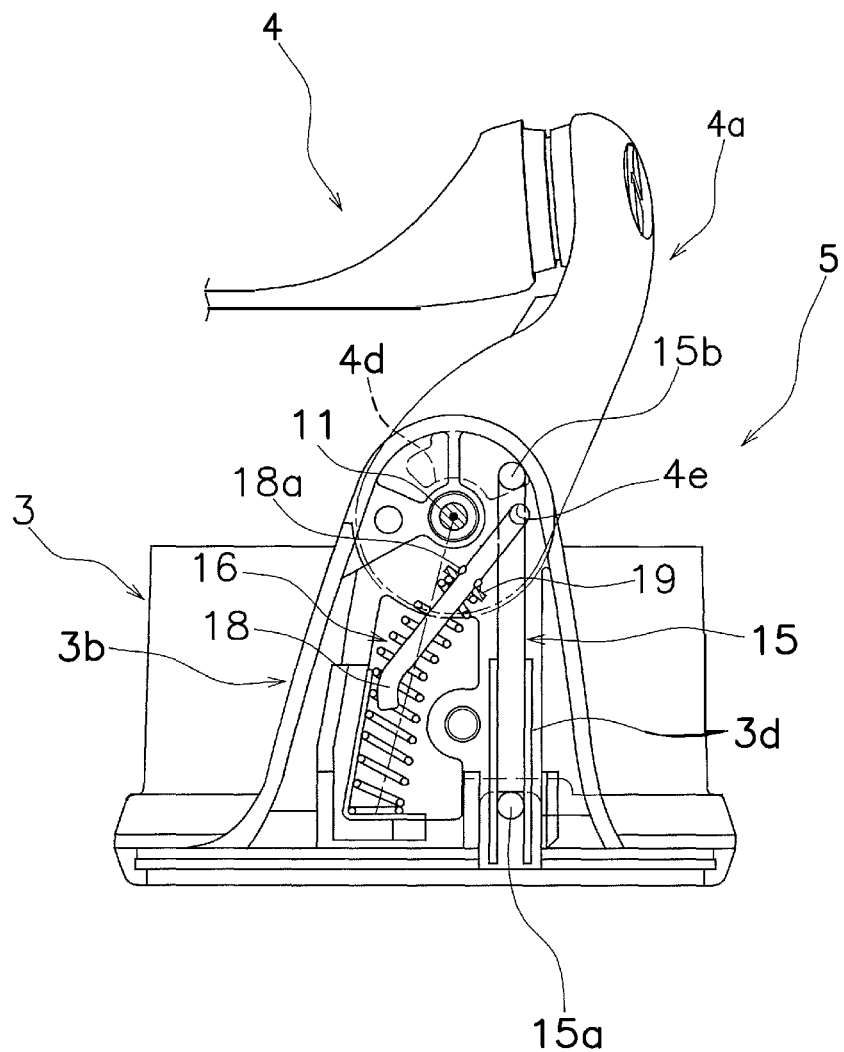
FIG. 2 is a side view of a first rotor arm including a bail arm in a line-winding posture.
Figure 3:
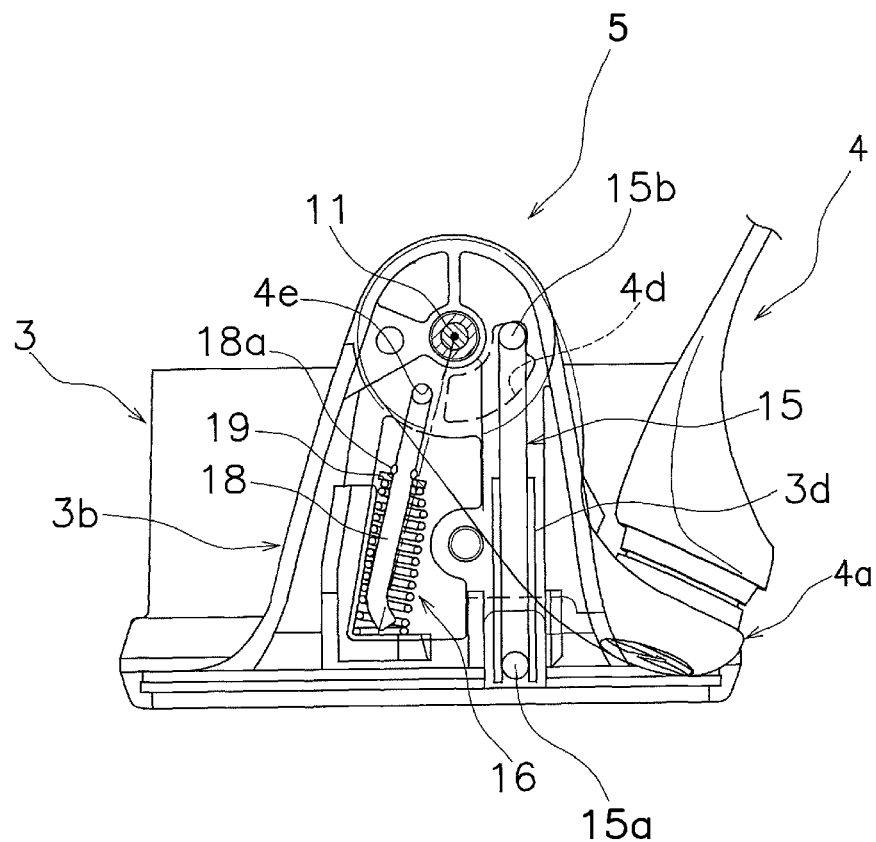
FIG. 3 is a side view of the first rotor arm including the bail arm in a line-releasing posture.

The moving member 15 is movable between a first position illustrated in FIG. 2 and a second position which is located behind the first position as illustrated in FIG. 3, in conjunction with the swinging of the bail arm 4 between the line-winding posture and the line-releasing posture. Specifically, the moving member 15 is guided by a guide 3d extending in a front/back direction relative to the recessed groove 4d and the first rotor arm 3b, to move between the first position and the second position in conjunction with the swinging of the bail arm 4.

The toggle spring 16 is a member to toggle and bias the bail arm 4 to the line-winding posture or to the line-releasing posture, and hold the bail arm 4 in the line-winding posture or the line-releasing posture. The toggle spring 16 is, at the rear end of it, in engagement with the first rotor arm 3b. The toggle spring 16 is a coil-shaped spring. A rod 18 extends along the first rotor arm 3b partially through the toggle spring 16 from the fore end of the spring 16.

The rod 18 is biased toward the first bail support 4a by the toggle spring 16. The rod 18 has a locking protrusion 18a at the intermediate portion, and between the locking protrusion 18a and a fore end of the toggle spring 16, a washer 19 is interposed. The fore end of the rod 18 is in engagement with an engagement hole 4e in the first bail support 4a, so as to swing about a center of the swing of the first bail support 4a in conjunction with the swing of the first bail support 4a. This configuration causes a change in distance between a rear end of the toggle spring 16 and a fore end of the rod 18, and the toggle spring 16 is compressed.

A dead center of the toggle spring 16 occurs when the fore end of the rod 18 is located on a straight line connecting between a center of the base end of the toggle spring 16 and the center of the swing of the first bail support 4a: at this time, the toggle spring 16 is most compressed. The toggle spring 16 toggles and biases the bail arm 4 to the line-winding posture or to the line-releasing posture, across the dead center.

Figure 4:
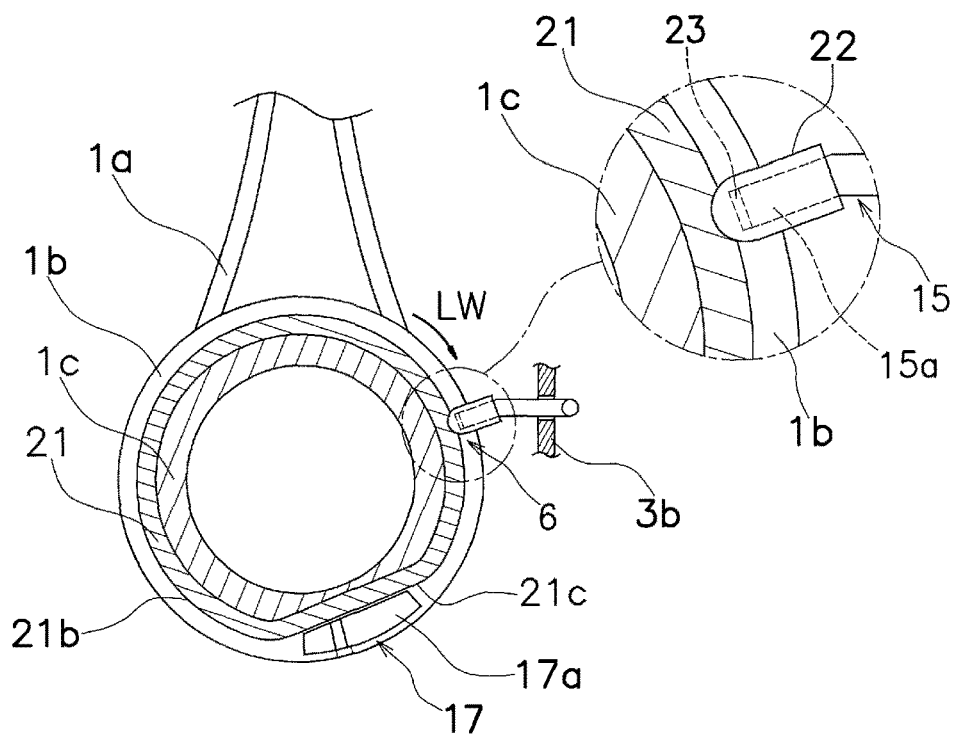
FIG. 4 is a partial front view of a reel body including a rotor brake mechanism.
Figure 5:
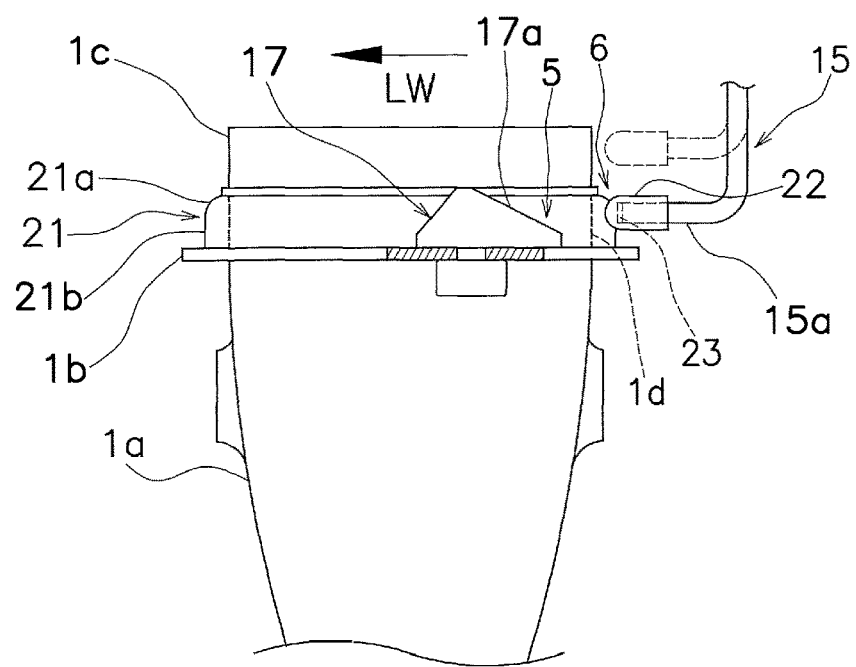
FIG. 5 is a partial side view of the reel body including the rotor brake mechanism.

The switching member 17 is a member that moves the moving member 15, in conjunction with the rotation of the rotor 3, from the second position to the first position, which are indicated by a solid line and a broken line, respectively in FIG. 5. As illustrated in FIG. 4, the switching member 17 is disposed on an outer peripheral portion of a straight portion 21c of a braking member 21 which is to be described later. The first position of the moving member 15 indicated by the broken line in FIG. 5 corresponds to the first position of the moving member 15 illustrated in FIG. 2. Similarly, the second position of the moving member 15 indicated by the solid line in FIG. 5 corresponds to the second position of the moving member 15 illustrated in FIG. 3.

When the moving member 15 is in the second position (see FIG. 5), the rotor 3 rotates in a line winding direction LW and reaches a predetermined position, and an elastic member 22, which is to be described later, attached to the first extended portion 15a of the moving member 15 comes into contact with the switching member 17. Specifically, the switching member 17 has a slope 17a that is inclined in a direction that gradually pushes the moving member 15 up in a first position direction (forward). When the first extended portion 15a of the moving member 15 moves along the slope 17a as a result of the rotation of the rotor 3, the first extended portion 15a of the moving member 15 is gradually pushed up in the first position direction. Then, when the moving member 15 is pushed up to a position beyond the dead center of the toggle spring 16, the bail arm 4 that has been biased toward the line-releasing posture is biased toward the line-winding posture, and the bail arm 4 finally returns to the line-releasing posture.

The rotor brake mechanism 6 brakes rotation of the rotor 3 when the bail arm 4 is in the line-releasing posture. As illustrated in FIG. 4 and FIG. 5, the rotor brake mechanism 6 includes the braking member 21, the moving member 15, the elastic member 22, and an adjustment member 23.

In this embodiment, the braking member 21 is an elastically deformable ring-shaped member made of, for example, rubber. The braking member 21 is of a substantially D-shape as seen from the axial direction, and is mounted to a mounting groove 1d that is located on the tubular portion 1c of the reel body 1. The braking member 21 has a curved outer peripheral surface 21a with a smooth outer edge at the front. The outer peripheral surface of the braking member 21 includes an annular portion 21b and the straight portion 21c. The annular portion 21b is to contact with the elastic member 22 which is described later. The switching member 17 that is a part of the bail tripping mechanism 5 is disposed on an outer peripheral portion of the straight portion 21c.

The moving member 15 is one part of the bail tripping mechanism 5, and also one part of the rotor brake mechanism 6. The first extended portion 15a of the moving member 15 is directed toward the center of rotation of the rotor 3. When the moving member 15 moves from the first position to the second position, the first extended portion 15a is positioned on the outer side of the braking member 21 in the radial direction, and also the fore end of the first extended portion 15a faces the annular portion 21b of the braking member 21.

The elastic member 22 is an elastically deformable rubber cap, for example, and has a top end of a spherical shape. The elastic member 22 has an inner space that can house the first extended portion 15a of the moving member 15 and the adjustment member 23. The space inside the elastic member 22 houses the fore end of the first extended portion 15a of the moving member 15. In other words, the first extended portion 15a of the moving member 15 is covered with the elastic member 22.

As illustrated in FIG. 4, as seen from the axial direction, the top end of the elastic member 22 is disposed at a position to overlap with at least a part of the annular portion 21b of the braking member 21. With this configuration, when the moving member 15 moves to the second position in conjunction with the swinging of the bail arm 4 toward the line-releasing posture, the elastic member 22 comes into contact with the annular portion 21b of the braking member 21. Through the contact and friction between the elastic member 22 and the annular portion 21b of the braking member 21, the rotation of the rotor 3 is braked when the bail arm 4 is in the line-releasing posture. Thus, the elastic member 22 is an example of a means for braking the rotation of the rotor 3.

The adjustment member 23 is housed in the space inside the elastic member 22 between the end of the first extended portion 15a of the moving member 15 and the end face of the internal space. In this embodiment, the adjustment member 23 is, for example, a shim or a washer that adjusts the position of the elastic member 22 in the radial direction. With this configuration, the elastic member 22 can be disposed at a position where a certain amount of friction force is available, which stabilizes the friction force free from the influence of manufacturing errors, installation errors, or other issues. Thus, the adjustment member 23 is an example of a means for stabilizing the friction force of the rotor brake mechanism 6. In addition, through the adjustment member 23 adjusting the position of the elastic member 22 in the radial direction, the force with which the elastic member 22 pushes the braking member 21 becomes adjustable, and hence the friction force of the rotor brake mechanism 6 can be easily adjusted.

Second Embodiment

Figure 6:
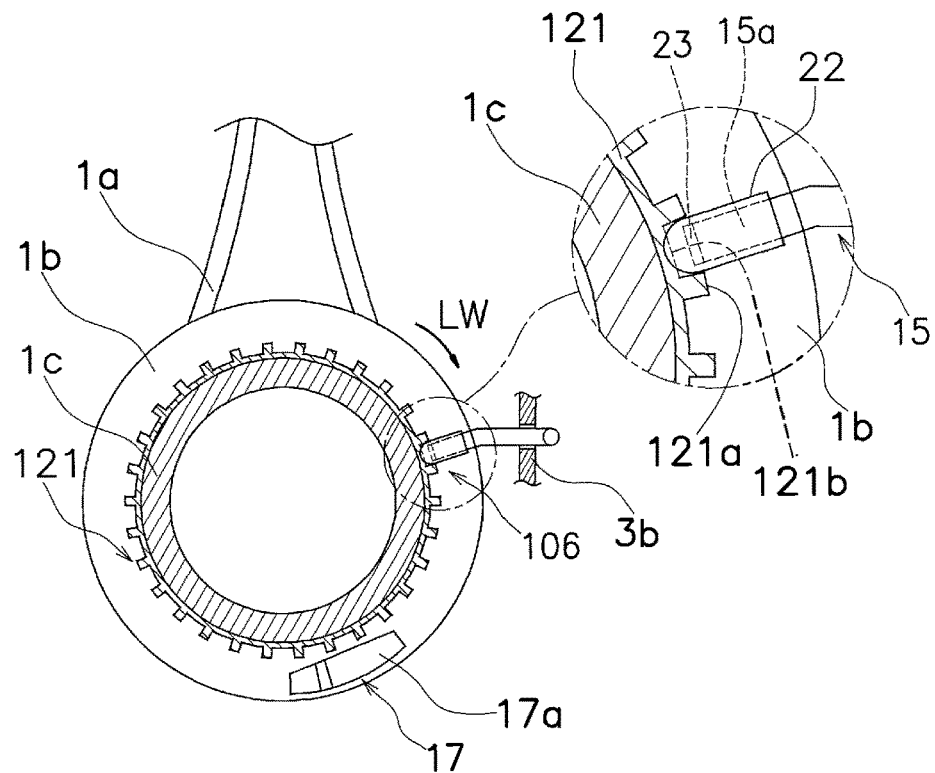
FIG. 6 is a diagram that corresponds to FIG. 4 according to another embodiment.
Figure 7:
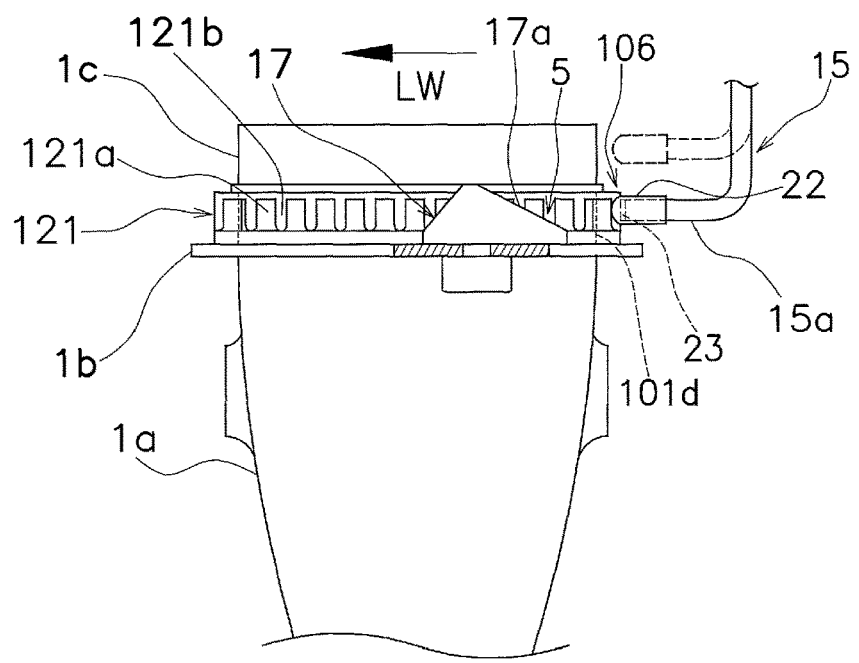
FIG. 7 is a diagram that corresponds to FIG. 5 according to another embodiment.

As illustrated in FIG. 6 and FIG. 7, a spinning reel to which a second embodiment of the present disclosure has been adopted includes a braking member (e.g., friction ring) 121 that has a configuration different from that of the first embodiment. Descriptions of configurations similar to those of the first embodiment are omitted herein, and only a description of configurations different to those of the first embodiment is provided. In FIG. 6 and FIG. 7, the same reference symbols as those in the first embodiment are used to denote configurations similar to those in the first embodiment.

The braking member 121 is an elastically deformable annular member made of rubber, for example. The braking member 121 is mounted to a mounting groove 101d that is annularly formed on the tubular portion 1c of the reel body 1, and frictionally engages with the mounting groove 101d in a manner that allows relative rotation.

The braking member 121 includes a plurality of engagement portions 121a that extend from an outer periphery of the braking member 121 radially outward with a predetermined interval between them. When the bail arm 4 swings to the line-releasing posture, and the moving member 15 moves to the second position, the elastic member 22 engages with the engagement portions 121a, and the elastic member 22 comes into contact with bottom portion 121b between the engagement portions 121a, to thereby press the braking member 121 toward the mounting groove 101d.

With this configuration, when the bail arm 4 is in the line-releasing posture and the rotor 3 starts to rotate, the mounting groove 101d of the reel body 1 and the braking member 121 frictionally engage with one another, and thereby the rotation of the rotor 3 is braked.

In this embodiment, when the moving member 15 moves to the second position, the position of the elastic member 22 in the radial direction is adjusted by the adjustment member 23, such that the elastic member 22 comes into contact with and pushes the bottom portion 121b between the engagement portions 121a. Therefore, the friction force can be stabilized free from the influence of manufacturing errors, installation errors, or other issues. In addition, similarly to the first embodiment, the force with which the adjustment member 23 pushes the braking member 121 becomes adjustable, thus facilitating the adjustment of the friction force of the rotor brake mechanism 106.

In addition, through disposing the elastic member 22 at a position at which the braking member 121 is pushed when the moving member 15 moves to the second position, the elastic member 22 engages with the engagement portions 121a even when the engagement portions 121a extend a shorter length radially outward. With this configuration, the braking member 121 can be downsized in the radial direction.

Other Embodiments

An embodiment of the present disclosure has been described above, but the present disclosure is not limited to the above-described embodiments, and various changes to the present disclosure are possible without departing from the gist of the disclosure. In particular, the plurality of embodiments described herein may be combined in any way as needed.

Figure 8:
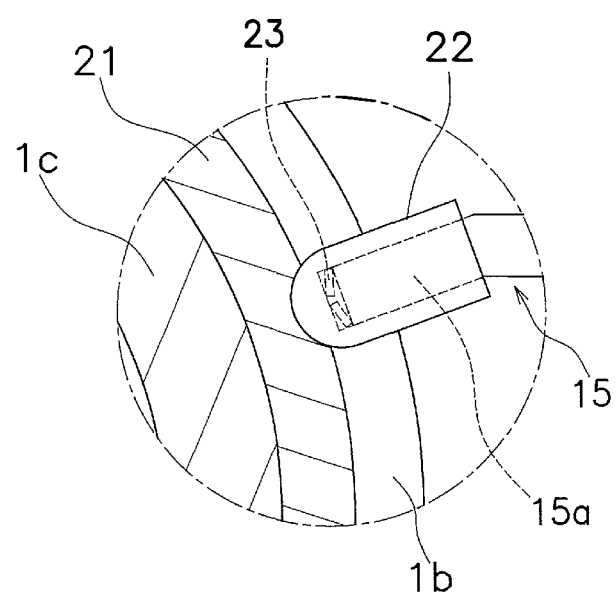
FIG. 8 is a diagram that corresponds to a partially enlarged view of FIG. 4 according to another embodiment.

(a) In the above-described embodiments, the adjustment member 23 as the shim or the washer is located between the elastic member 22 and the first extended portion 15a of the moving member 15, but the adjustment member 23 is not limited to this example. For example, as illustrated in an enlarged manner in FIG. 8, a spring such as a Belleville washer that biases the elastic member 22 radially inward can be used as the adjustment member 23. In this case, stable friction force can be obtained, and time and effort of adjusting the position during assembly is reduced, resulting in more efficient assembly work. Similarly, a spring can be used for the adjustment member 23 in the second embodiment also.

(b) The shapes of the braking members 21 and 121 are not limited to those in the above-described embodiments. For example, a flat spring can be used which is pressed to form a braking member that comes in direct contact with the reel body 1, and the engaging portions 121a can have any shape as long as they engage with the elastic member 22.

REFERENCE SIGNS LIST 1 reel body
3 rotor
4 bail arm
6, 106 rotor brake mechanism
15 moving member
15a first extended portion
21, 121 braking member
22 elastic member
23 adjustment member
100 spinning reel
121a engagement portion

What is claimed is:

1. A rotor brake mechanism for a spinning reel that brakes a rotor rotatably mounted to a reel body, in conjunction with the swinging of a bail arm between a line-winding posture and a line-releasing posture, the system comprising:
a braking member disposed in the reel body;
a moving member disposed in the rotor so as to move, in conjunction with the bail arm, to a first position corresponding to the line-winding posture and to a second position corresponding to the line-releasing posture, the moving member including an extended portion that extends toward the braking member when the moving member moves to the second position;
an elastic member disposed on the extended portion of the moving member, so as to come into contact with an outer peripheral surface of the braking member when the moving member moves to the second position; and
an adjustment member disposed between the extended portion of the moving member and the elastic member, so as to adjust a position of the elastic member.

2. The rotor brake mechanism according to claim 1, wherein:
the braking member includes a plurality of engagement portions on an outer periphery of the braking member;
the extended portion of the moving member engages with the plurality of engagement portions of the braking member when the moving member moves to the second position; and
the elastic member comes into contact with the outer peripheral surface of the braking member when the moving member moves to the second position.

3. The rotor brake mechanism according to claim 1, wherein the adjustment member adjusts a radial position of the elastic member.

4. The rotor brake mechanism according to claim 1, wherein the adjustment member is a spring that biases the elastic member radially inward.

5. The rotor brake mechanism according to claim 1, wherein the elastic member is a rubber cap.

6. The rotor brake mechanism according to claim 1, wherein the adjustment member adjusts the position of the elastic member to come into contact with the outer peripheral surface of the braking member.

7. The rotor brake mechanism according to claim 1, wherein the elastic member houses the adjustment member and at least part of the extended portion of the moving member.

8. The rotor brake mechanism according to claim 1, wherein the braking member is elastically deformable and is at least partially annular.

9. A rotor brake mechanism for a spinning reel that brakes a rotor rotatably mounted to a reel body, in conjunction with the swinging of a bail arm between a line-winding posture and a line-releasing posture, the system comprising:
a braking member disposed in the reel body;
a moving member disposed in the rotor so as to move, in conjunction with the bail arm, to a first position corresponding to the line-winding posture and to a second position corresponding to the line-releasing posture, the moving member including an extended portion that extends toward the braking member when the moving member moves to the second position;
means for braking a rotation of the rotor, the means for braking disposed on the extended portion of the moving member; and
means for stabilizing the friction force of the rotor brake mechanism, the means for stabilizing disposed between the extended portion of the moving member and the means for braking.

10. The rotor brake mechanism according to claim 9, wherein:
the braking member includes a plurality of engagement portions on an outer periphery of the braking member;
the extended portion of the moving member engages with the plurality of engagement portions of the braking member when the moving member moves to the second position; and the means for braking comes into contact with an outer peripheral surface of the braking member when the moving member moves to the second position.

11. The rotor brake mechanism according to claim 9, wherein the means for braking is a rubber cap.

12. The rotor brake mechanism according to claim 9, wherein the mean for braking houses the means for stabilizing and at least part of the extended portion of the moving member.

13. A spinning reel, comprising:

a reel body including a braking member;

a rotor rotatably mounted to the reel body, the rotor including a moving member to move, in conjunction with a bail arm, to a first position corresponding to a line-winding posture and to a second position corresponding to a line-releasing posture, the moving member including an extended portion that extends toward the braking member when the moving member moves to the second position;

an elastic member disposed on the extended portion of the moving member, to come into contact with an outer peripheral surface of the braking member when the moving member moves to the second position; and an adjustment member disposed between the extended portion of the moving member and the elastic member, to adjust a position of the elastic member.

14. The spinning reel according to claim 13, wherein:

the braking member includes a plurality of engagement portions on an outer periphery of the braking member;

the extended portion of the moving member engages with the plurality of engagement portions of the braking member when the moving member moves to the second position; and the elastic member comes into contact with the outer peripheral surface of the braking member when the moving member moves to the second position.

15. The spinning reel according to claim 13, wherein the adjustment member adjusts a radial position of the elastic member.

16. The spinning reel according to claim 13, wherein the adjustment member is a spring that biases the elastic member radially inward.

17. The spinning reel according to claim 13, wherein the elastic member is a rubber cap.

18. The spinning reel according to claim 13, wherein the adjustment member adjusts the position of the elastic member to come into contact with the outer peripheral surface of the braking member.

19. The spinning reel according to claim 13, wherein the elastic member houses the adjustment member and at least part of the extended portion of the moving member.

20. The spinning reel according to claim 13, wherein the braking member is elastically deformable and is at least partially annular.

* * * * *